(12) United States Patent
Yamanaka et al.

(10) Patent No.: US 10,175,683 B2
(45) Date of Patent: Jan. 8, 2019

(54) TEACHING DATA PREPARATION DEVICE AND TEACHING DATA PREPARATION METHOD FOR ARTICULATED ROBOT

(71) Applicant: HONDA MOTOR CO., LTD., Tokyo (JP)

(72) Inventors: Masahiro Yamanaka, Tochigi-ken (JP); Masao Shimoyama, Tochigi-ken (JP); Tetsuya Yoshino, Tochigi-ken (JP); Shinji Aoki, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 94 days.

(21) Appl. No.: 15/308,002

(22) PCT Filed: May 1, 2014

(86) PCT No.: PCT/JP2014/062107
§ 371 (c)(1),
(2) Date: Oct. 31, 2016

(87) PCT Pub. No.: WO2015/166574
PCT Pub. Date: Nov. 5, 2015

(65) Prior Publication Data
US 2017/0095924 A1 Apr. 6, 2017

(51) Int. Cl.
*G05B 19/42* (2006.01)
*B25J 9/16* (2006.01)

(52) U.S. Cl.
CPC .............. *G05B 19/42* (2013.01); *B25J 9/163* (2013.01); *G05B 2219/36461* (2013.01);
(Continued)

(58) Field of Classification Search
CPC ......... B25J 9/163; B25J 9/161; Y01S 901/03; Y01S 901/43; Y01S 901/42;
(Continued)

(56) References Cited

U.S. PATENT DOCUMENTS 5,530,791 A 6/1996 Okabayashi
5,845,053 A * 12/1998 Watanabe ................ B23K 9/12
700/262
(Continued)

FOREIGN PATENT DOCUMENTS

JP 5-127718 A 5/1993
JP 3647404 B2 5/2005
(Continued)

OTHER PUBLICATIONS

International Search Report (PCT/ISA/210) issued in PCT/JP2014/062107, dated Aug. 5, 2014.

*Primary Examiner* — Dale Moyer
(74) *Attorney, Agent, or Firm* — Birch, Stewart, Kolasch & Birch, LLP

(57) ABSTRACT

The present invention relates to a teaching data preparation device and a teaching data preparation method for an articulated robot. Pre-existing position data that approximates new position data is retrieved from a database that, from among data related to working points for a pre-existing workpiece, stores for each working point pre-existing position data that indicates the position of the working point and pre-existing orientation data that indicates the orientation of an end effector at the working point. Next, pre-existing orientation data that is associated with the retrieved pre-existing position data is extracted. Next, incomplete new orientation data is completed using the extracted pre-existing orientation data. As a result of this series of processes, the precision of teaching data can be improved.

9 Claims, 12 Drawing Sheets

(52) U.S. Cl.
CPC ... *G05B 2219/36492* (2013.01); *Y10S 901/03* (2013.01); *Y10S 901/28* (2013.01); *Y10S 901/42* (2013.01)

(58) Field of Classification Search
CPC .................. Y01S 901/28; G05B 19/42; G05B 2219/36461; G05B 2219/36492
See application file for complete search history.

(56) References Cited

U.S. PATENT DOCUMENTS

| | | | | |
|---|---|---|---|---|
| 2005/0107919 | A1* | 5/2005 | Watanabe | B25J 9/1656 700/245 |
| 2006/0030970 | A1* | 2/2006 | Watanabe | G05B 19/425 700/248 |
| 2006/0255758 | A1* | 11/2006 | Takahashi | G05B 19/425 318/568.13 |

FOREIGN PATENT DOCUMENTS

| | | |
|---|---|---|
| JP | 4000306 B2 | 10/2007 |
| JP | 2013-117864 A | 6/2013 |

\* cited by examiner

TEACHING DATA PREPARATION DEVICE AND TEACHING DATA PREPARATION METHOD FOR ARTICULATED ROBOT

TECHNICAL FIELD

The present invention relates to a teaching data preparation device and a teaching data preparation method for an articulated robot, for carrying out an operation in accordance with teaching data to sequentially move an end effector, which is attached to the distal end of an arm, to a plurality of working points that are set on a workpiece.

BACKGROUND ART

An articulated robot for welding, which is arranged on a production line for manufacturing automotive vehicle bodies, is equipped with an end effector (welding gun) on the distal end of an arm, wherein by driving the arm, the end effector is moved to respective working points (respective welding spots) to carry out spot welding. An orientation of the end effector at the respective working points and a movement path of the end effector between two of the working points are preset beforehand as teaching data. As a teaching data setting method, although both on-line teaching and off-line teaching are known, in recent years, a demand for off-line teaching is growing. In such circumstances, techniques for preparing teaching data with high efficiency are desired.

In Japanese Patent No. 3647404 (hereinafter referred to as Patent Document 1), a technique is disclosed for automatically preparing teaching data relating to the movement path of an end effector. More specifically, a technique is disclosed for automatically setting a movement path (short range motion path) for pulling an electrode of the end effector from inside a workpiece to the outside of a workpiece, and a movement path (wide range motion path) for moving the end effector between two working points.

In Japanese Patent No. 4000306 (hereinafter referred to as Patent Document 2), a technique is disclosed for automatically preparing teaching data relating to the orientation of an end effector at respective working points. More specifically, a technique is disclosed in which, after having corrected orientation data of an end effector at respective working points of arbitrary sites, for example, a window frame, of a first vehicle type, the orientation data for the end effector is used at respective working points of arbitrary sites, for example, a window frame, of a second vehicle type.

SUMMARY OF INVENTION

In the technique of Patent Document 1, the movement path of the end effector is set automatically. Therefore, the burden on an operator concerning the teaching data is reduced. However, it is still necessary for the operator to set an orientation for the end effector at the respective working sites. Thus, the technique is inefficient in this respect.

According to Patent Document 2, orientation for the end effector at the respective working sites is set automatically. Therefore, it is possible to compensate for a lacking or insufficient part of the technique of Patent Document 1. However, the technique of Patent Document 2 only is concerned with diverting, i.e., reusing, the data between specified sites and specified vehicle types. If such data is diverted and reused between dissimilar vehicle types, there is a possibility for the accuracy of the teaching data to deteriorate.

The present invention has been devised while taking into consideration the aforementioned problems, and has the object of providing a teaching data preparation device and a teaching data preparation method for an articulated robot, which are capable of improving the efficiency of a teaching operation when preparing teaching data for new workpieces, by efficiently setting teaching data with high precision.

The present invention is characterized by a teaching data preparation device for an articulated robot, for carrying out an operation in accordance with teaching data to sequentially move an end effector, which is attached to a distal end of an arm, to a plurality of working points that are set on a workpiece, comprising a preexisting data storage unit configured to store in association with each of the working points, and from among data relating to the working points of a preexisting workpiece, preexisting position data that indicates positions of the working points, and preexisting orientation data that indicates orientations of the end effector at the working points, a new data supplying unit configured to supply, from among data relating to the working points of a new workpiece, new position data that indicates positions of the working points, and incomplete new orientation data that indicates orientations of the end effector at the working points, and an orientation data preparing unit configured to search for and retrieve from the preexisting data storage unit the preexisting position data that approximates the new position data of the new data supplying unit, extract the preexisting orientation data that is associated with the retrieved preexisting position data, and complete the incomplete new orientation data using the extracted preexisting orientation data.

The preexisting orientation data and the new orientation data of the present invention may be indicated by angles of rotation centered about three mutually perpendicular axes of rotation taking the working points as reference points, and the incomplete new orientation data may be indicated by an angle of rotation centered about an axis of rotation that coincides with a normal direction of a surface of the working points from among the three axes of rotation.

The orientation data preparing unit of the present invention may be configured to associate the new position data and the new orientation data with each other and store them in the preexisting data storage unit.

The present invention may further comprise a movement path setting unit configured to, using the new position data and the new orientation data for each of the working points, set a movement path of the end effector between two of the working points of the new workpiece.

The new data supplying unit may further be configured to supply obstacle position data for indicating a position of an obstacle that lies within a range in which the end effector is capable of moving. In addition, the movement path setting unit may be configured to determine whether or not the obstacle is present between the two working points, and may set as the movement path a linear path that connects the two working points in a straight line in a case it is determined that the obstacle is not present between the two working points, and may set an avoidance path that avoids the obstacle in a case it is determined that the obstacle is present between the two working points.

Further, the present invention is characterized by a teaching data preparation method for an articulated robot, for carrying out an operation in accordance with teaching data to sequentially move an end effector, which is attached to a distal end of an arm, to a plurality of working points that are set on a workpiece, comprising a new data supplying step of supplying, from among data relating to the working points of a new workpiece, new position data that indicates positions of the working points, and incomplete new orientation data that indicates orientations of the end effector at the working points, a preexisting data searching step of searching for and retrieving preexisting position data that approximates the new position data supplied by the new data supplying step from a database in which, from among data relating to the working points of a preexisting workpiece, there are stored in association with each of the working points, preexisting position data that indicates positions of the working points, and preexisting orientation data that indicates orientations of the end effector at the working points, a preexisting data extraction step of extracting the preexisting orientation data that is associated with the retrieved preexisting position data, and an orientation data preparation step of completing the incomplete new orientation data using the extracted preexisting orientation data.

In the orientation data preparation step of the present invention, the new position data and the new orientation data may be associated with each other and stored in the database.

The present invention may further comprise a movement path setting step of setting a movement path of the end effector between two of the working points of the new workpiece, using the new position data and the new orientation data for each of the working points.

The movement path setting step of the present invention may include a determining step that determines whether or not an obstacle is present between two of the working points, a linear path setting step that sets as the movement path a linear path that connects the two working points in a straight line, in a case it is determined that the obstacle is not present between the two working points, and an avoidance path setting step that sets an avoidance path for avoiding the obstacle, in a case it is determined that the obstacle is present between the two working points.

In the present invention, when the teaching data for the new workpiece is set, data are searched for and used that approximate to a certain extent or more the data of the new workpiece from among all of the data that relates to the preexisting workpiece. Therefore, it is possible to enhance the accuracy of the teaching data.

Further, in the present invention, the preexisting orientation data that are used when preparing the new orientation data are searched for mechanically by a specified approximating determination. Therefore, extraction of the preexisting data can easily be performed regardless of the experience of the operator. As a result, the setting operation for the teaching data can be facilitated.

DESCRIPTION OF EMBODIMENTS

A teaching data preparation device and a teaching data preparation method for an articulated robot according to the present invention will be described with reference to the drawings. According to the present invention, teaching is assumed with respect to an articulated robot that performs welding of a vehicle body.

Figure 1:
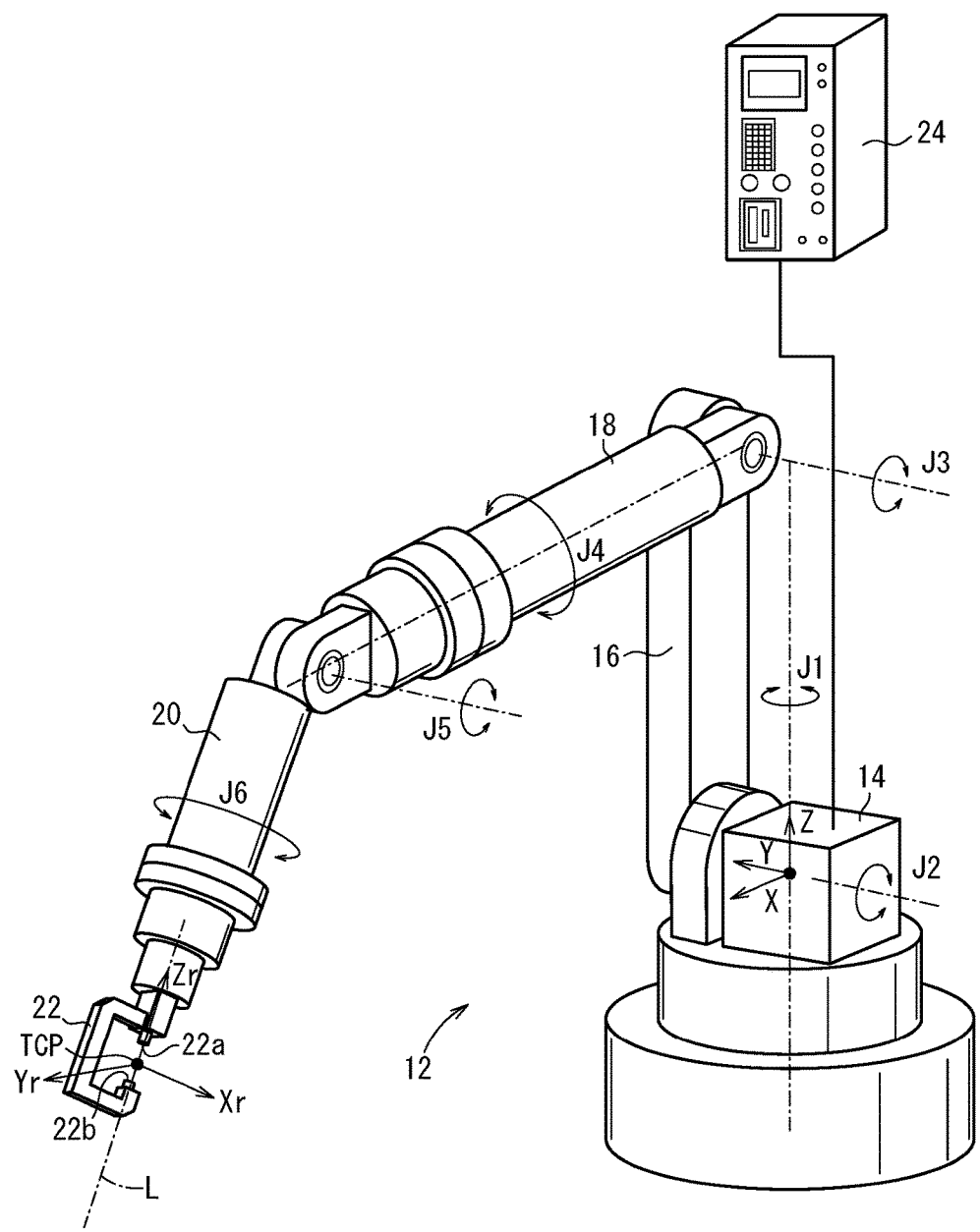
FIG. 1 is a view showing the structure of an articulated robot.

FIG. 1 shows the structure of an articulated robot 12. The articulated robot 12 is an articulated type of industrial robot, including a base 14, a first arm 16, a second arm 18, and a third arm 20, which are disposed in this order treating the base 14 as a reference. An end effector 22, which is a welding gun, is provided on a distal end of the third arm 20. The end effector 22 is attachable and detachable with respect to the third arm 20. The first arm 16 is capable of rotating about rotatable axes J1, J2 horizontally and vertically with respect to the base 14. The second arm 18 is connected rotatably by an axis J3 with the first arm 16. The second arm 18 is capable of undergoing twisting rotation about an axis J4. The third arm 20 is connected rotatably by an axis J5 with the second arm 18. The third arm 20 is capable of undergoing twisting rotation about an axis J6. The axis J4 and the axis J6 are capable of undergoing twisting rotation, respectively, through 360° or greater.

As reference points for the purpose of coordinate calculation and control concerning the articulated robot 12, the point of intersection between the axis J1 and the axis J2 is defined as an origin point (coordinate center point), and about the origin point, the vertical upward direction (the upward direction in FIG. 1) is expressed as a height Z, the direction of the axis J2 when the angle of rotation θ1 is θ1=0 is represented as a depth Y, and the direction perpendicular to the height Z and the depth Y is represented as a width X. A three-dimensional orthogonal coordinate system is denoted by the height Z, the width X, and the depth Y.

The end effector 22 is a C-type welding gun having a pair of electrodes 22a, 22b that open and close on an axis L. In a closed condition, the electrodes 22a, 22b contact a workpiece at a working point (also referred to as a TCP (Tool Center Point)) on the axis L. The posture or orientation of the end effector 22 is defined by angles of rotation, centered about respective central axes which are the three mutually perpendicular axes taking the working point as a reference point. As one of the three axes, the axis that coincides with an axial line L of the electrodes 22a, 22b is designated by Zr, whereas the angle of rotation about the axis Zr is designated by Rz. The axis Zr coincides with a direction normal to the surface of the working point. As one of the three axes, an axis facing outwardly from the end effector 22 is designated by Xr, whereas the angle of rotation about the axis Xr is designated by Rx. As one of the three axes, the axis mutually perpendicular to the axes Xr and Zr is designated by Yr, whereas the angle of rotation about the axis Yr is designated by Ry. The orientation of the end effector 22 is indicated by the three angles of rotation Rx, Ry, Rz.

The driving mechanisms for the axes J1, J2, J3, J4, J5, and J6 as well as the opening/closing mechanism for the electrodes 22a, 22b are driven respectively by non-illustrated actuators, and the coordinates of the working points are determined by the angles of rotation of the axes J1 through J6 and the dimensions of various parts of the articulated robot 12.

By operation of the articulated robot 12 having such a six-axis configuration, the end effector 22, which is connected to the distal end, is capable of being moved to any arbitrary position in the vicinity of the vehicle, and is capable of being set at any arbitrary orientation. In other words, the end effector 22 is capable of moving with six degrees of freedom. The articulated robot 12 may be one having expanding and contracting movements in addition to rotational movements, and may have an operating member that performs a parallel link operation or the like.

The articulated robot 12 is operated in accordance with teaching data that is set in a robot controller 24. The articulated robot 12 and the robot controller 24 are arranged on a production line of a factory site where automobiles are manufactured.

Figure 2:
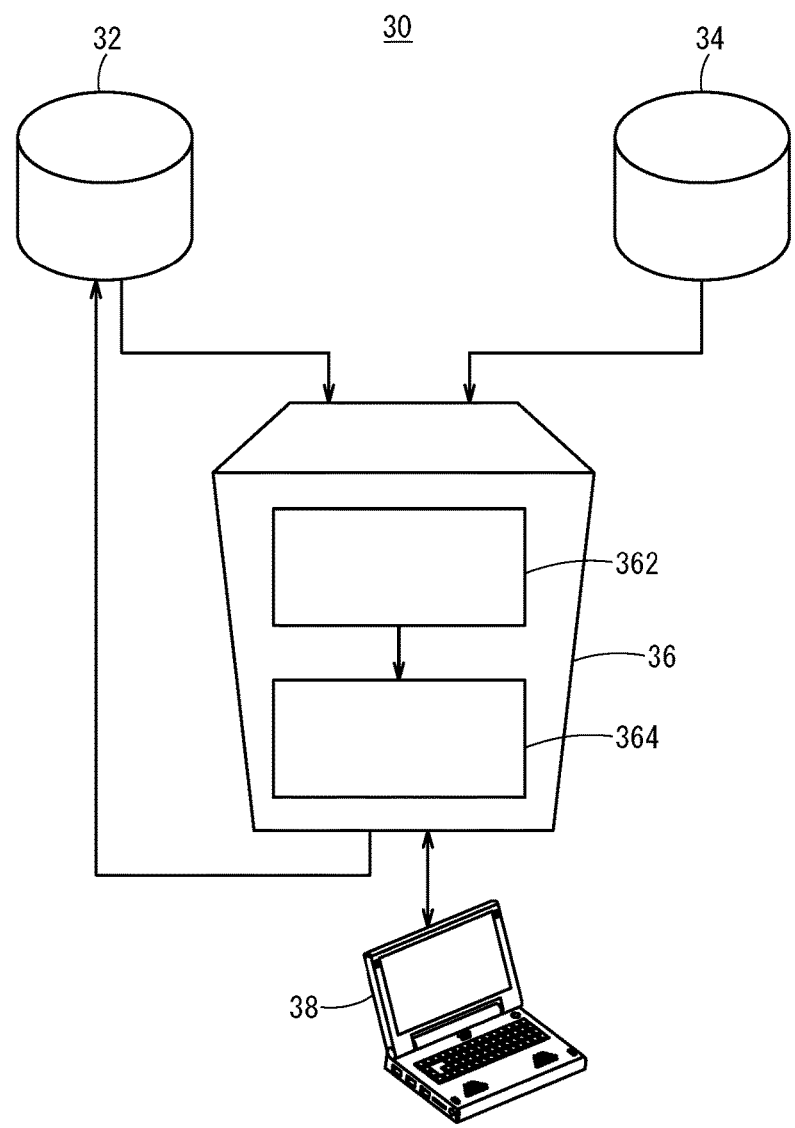
FIG. 2 is a diagram showing schematically a configuration of a teaching data preparation device for the articulated robot.

The teaching data that is set in the robot controller 24 is created and prepared in an articulated robot teaching data preparation device (hereinafter referred to as a "teaching data preparation device") 30 as shown in FIG. 2.

The teaching data preparation device 30 includes a preexisting data storage unit 32 that stores data in association with working points (in this case, welding points) of a preexisting workpiece, a new data supplying unit 34 that supplies data in relation to the working points of a new workpiece, a teaching data preparation unit 36 that creates or prepares teaching data concerning a movement path of the end effector 22 using the data of the preexisting data storage unit 32 and the new data supplying unit 34, and a terminal device 38 that outputs teaching data preparation command signals with respect to the teaching data preparation unit 36.

The preexisting data storage unit 32 is constituted by a database. The database, from among the data relating to the working points of the preexisting workpiece, stores in association with each of the working points, preexisting position data that indicates the positions of the working points, and preexisting orientation data that indicates the orientations of the end effector 22 at the working points. The preexisting position data is coordinate data (X, Y, Z) in which the positions of working points of the preexisting workpiece are indicated by a coordinate system set with reference to the origin point of the above-described articulated robot 12. The preexisting position data in this case is designated by (Xo, Yo, Zo). The preexisting orientation data is data of the angles of rotation (Rx, Ry, Rz) centered respectively about the above-described three axes (Xr, Yr, Zr). The preexisting orientation data in this case is designated by (Rxo, Ryo, Rzo).

As the amount of data that is stored in the preexisting data storage unit 32 becomes greater, it increases the possibility that the teaching data can be generated automatically. In the case that the workpiece is a vehicle body, it is preferable for all of the welding data for the preexisting vehicle body to be stored.

The new data supplying unit 34 is constituted by a database. The database, from among the data relating to the working points of the new workpiece, stores in association with an operation sequence (welding sequence), new position data that indicates the position of the working points, and new orientation data that indicates the orientation of the end effector 22 at the working points. Further, the database also stores therein jig position data indicative of the position of a jig, design data of the workpiece, and obstacle position data of obstacles within the production line, etc.

The new position data is coordinate data (X, Y, Z) in which the positions of working points of the new workpiece are indicated by a coordinate system set with reference to the origin point of the above-described articulated robot 12. The new position data in this case is designated by (Xn, Yn, Zn). The new orientation data is data of the angles of rotation (Rx, Ry, Rz) centered respectively about the above-described three axes (Xr, Yr, Zr). The new orientation data in this case is designated by (Rxn, Ryn, Rzn). However, the data that are stored in the new data supplying unit 34, from among the new orientation data (Rxn, Ryn, Rzn), are only incomplete orientation data (Rzn), which indicates an angle of rotation about the axis Zr of the direction normal to the surface of the new position data (Xn, Yn, Zn). In other words, the new data supplying unit 34 stores incomplete new orientation data.

The teaching data preparation unit 36 includes an orientation data preparing unit 362 that completes the new orientation data for the end effector 22, and a movement path setting unit 364 that generates a movement path for the end effector 22 between each of the working points within the new workpiece. The process carried out by the orientation data preparing unit 362 will be described in conjunction, when a description is given of the flowchart shown in FIG. 3. Further, the process carried out by the movement path setting unit 364 will be described in conjunction, when a description is given of the flowchart shown in FIG. 4. The teaching data in relation to the movement path of the end effector 22, which is created by the orientation data preparing unit 362 and the movement path setting unit 364, is stored in the preexisting data storage unit 32, and further, is copied to the robot controller 24 shown in FIG. 1 via a non-illustrated storage medium or a network.

The terminal device 38 is a human-machine interface constituted by a personal computer, which enables an operator to operate the teaching data preparation device 30. The terminal device 38 transmits to the teaching data preparation device 30 teaching data preparation command signals responsive to operations of the operator, and initiates a teaching process. Further, the terminal device 38 displays on a display unit the messages that are sent from the teaching data preparation device 30.

Next, using the flowchart shown in FIG. 3, a description will be given concerning the process carried out by the orientation data preparing unit 362.

When the operator performs a predetermined operation on the terminal device 38, a teaching data preparation command signal is transmitted from the terminal device 38 to the teaching data preparation device 30. When the teaching data preparation device 30 receives the teaching data preparation command signal, the orientation data preparing unit 362 performs the following process.

At first, in an operation sequence (welding sequence) from the new data supplying unit 34, new position data (Xn, Yn, Zn) and incomplete new orientation data (Rzn) are read out (step S301).

Next, preexisting position data (Xo, Yo, Zo) that approximates the new position data (Xn, Yn, Zn) is searched for and retrieved from the preexisting data storage unit 32 (step S302). More specifically, it is determined by the following formulas (1) through (3) whether a difference between the preexisting position data (Xo, Yo, Zo) and the new position data (Xn, Yn, Zn), i.e., a positional shift amount of new coordinates with respect to preexisting coordinates, lies within a predetermined range.

$$|Xo-Xn|<160 \text{ mm} \quad (1)$$

$$|Yo-Yn|<120 \text{ mm} \quad (2)$$

$$|Zo-Zn|<200 \text{ mm} \quad (3)$$

The threshold values 160 mm, 120 mm, and 200 mm used in the above formulas (1) through (3) can be changed appropriately by the terminal device 38. The searching target is all of the data that are stored in the preexisting data storage unit 32.

If approximate preexisting position data (Xo, Yo, Zo) exists in the preexisting data storage unit 32, then preexisting orientation data (Rxo, Ryo, Rzo) associated with such preexisting position data (Xo, Yo, Zo) is extracted from the preexisting data storage unit 32 (step S303). If multiple instances of approximate preexisting position data (Xo, Yo, Zo) are present, then preexisting position data (Xo, Yo, Zo) for which the shift amount thereof is smallest is selected.

Next, using a partial element (Rzo) of the extracted preexisting orientation data (Rxo, Ryo, Rzo) and the incomplete new orientation data (Rzn), the other partial elements (Rxo, Ryo) of the extracted preexisting orientation data are corrected, and new orientation data (Rxn, Ryn, Rzn) are created (step S304). More specifically, a rotation conversion is performed so that the new orientation data (Rzn) is made to coincide with the partial element (Rzo) of the preexisting orientation data. At this time, similarly, the other partial elements (Rxo, Ryo) of the preexisting orientation data are subjected to rotation conversion, and partial elements (Rxn, Ryn) of the new orientation data are created. When the partial elements (Rxn, Ryn) of the new orientation data that were created and the partial element (Rzn) of the incomplete new orientation data that was supplied are combined, the new orientation data (Rxn, Ryn, Rzn) is complete.

If the new orientation data (Rxn, Ryn, Rzn) have been created, the new orientation data (Rxn, Ryn, Rzn) are associated with the new position data (Xn, Yn, Zn) and are stored in the preexisting data storage unit 32 (step S305).

If step S305 has ended, then it is judged if the data of the new data supplying unit 34 are complete (step S306). If the data are not complete (step S306: NO), then the process sequence of steps S301 to S305 is repeated, whereas if the data are complete (step S306: YES), then the process sequence is brought to an end.

Next, using FIGS. 4, 5, 6, and 7, a description will be given concerning the process carried out by the movement path setting unit 364. In the following process, the movement path setting unit 364 determines the positions of respective working points in accordance with the new position data (Xn, Yn, Zn) that was supplied from the new data supplying unit 34, and further, determines the orientation or posture of the end effector 22 at each of the working points in accordance with the new orientation data (Rxn, Ryn, Rzn) that was created or prepared by the orientation data preparing unit 362.

Figure 3:
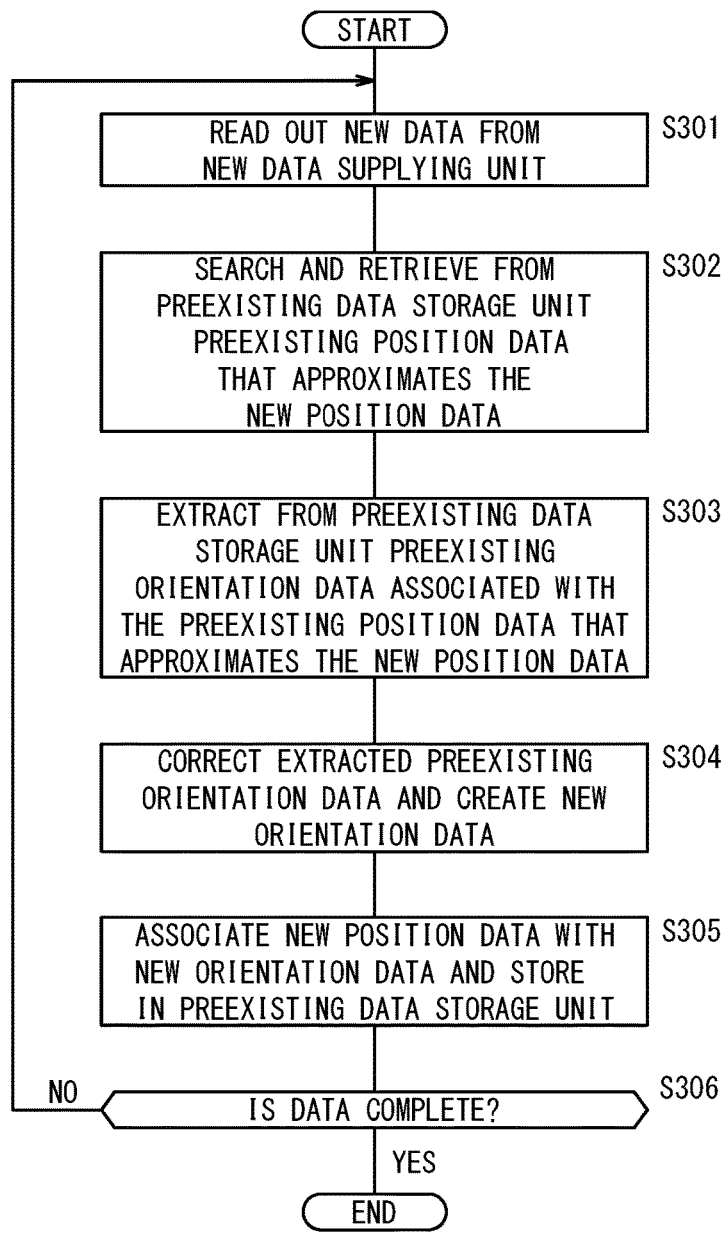
FIG. 3 is a flowchart of a process carried out by an orientation data preparing unit.
Figure 4:
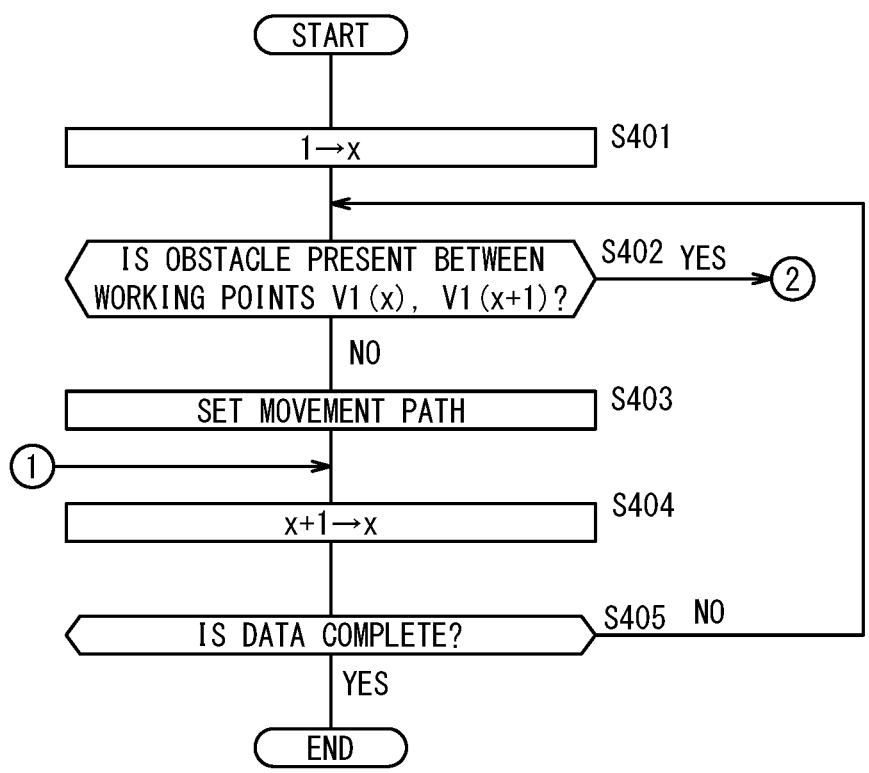
FIG. 4 is a flowchart of a process carried out by a movement path setting unit.
Figure 5:
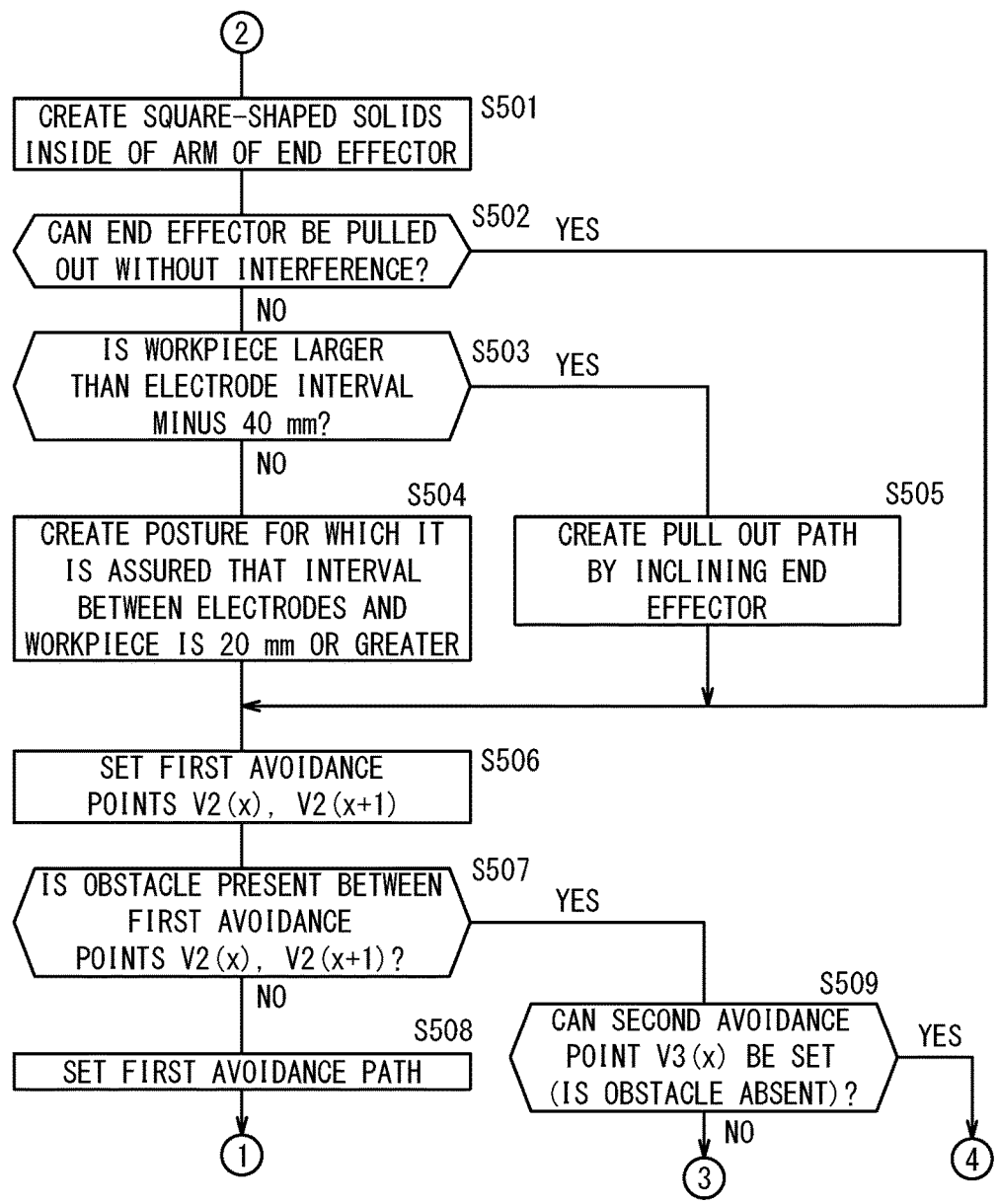
FIG. 5 is a flowchart of a process carried out by the movement path setting unit.
Figure 6:
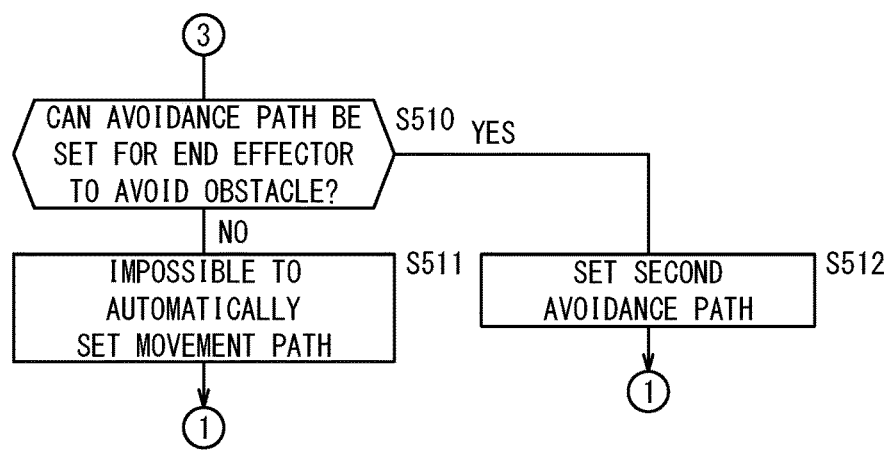
FIG. 6 is a flowchart of a process carried out by the movement path setting unit.
Figure 7:
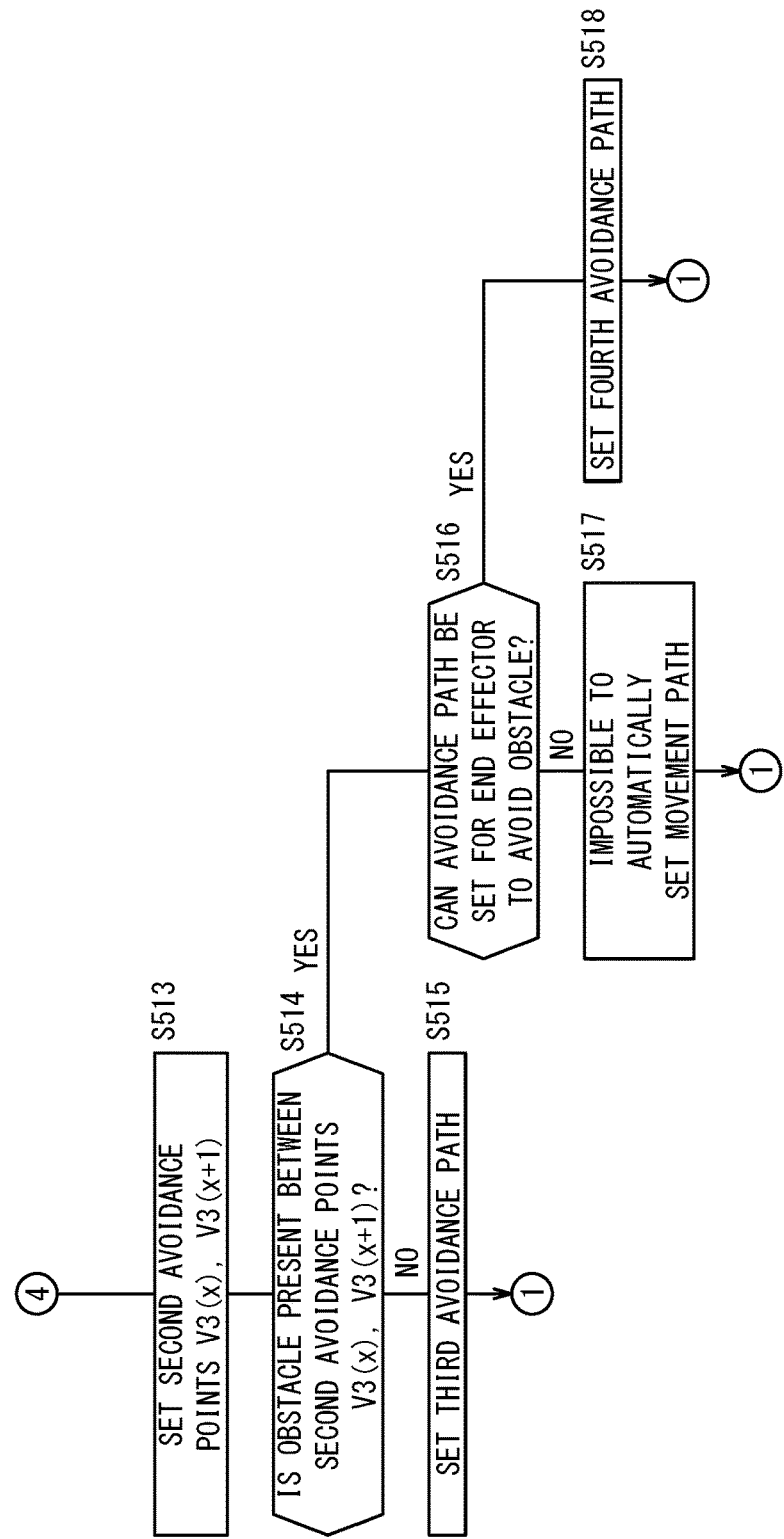
FIG. 7 is a flowchart of a process carried out by the movement path setting unit.

When the process sequence of the orientation data preparing unit 362 shown in FIG. 3 has ended, in an operation sequence (welding sequence), a process is carried out to create a movement path for the end effector 22.

Figure 8A:
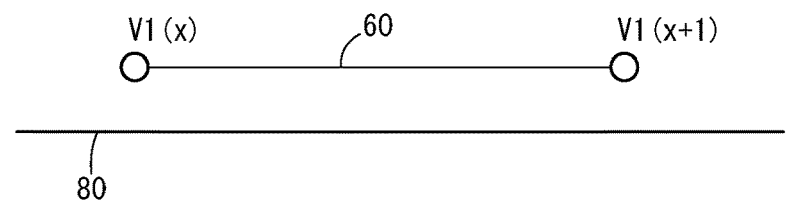
FIG. 8A is a schematic diagram for describing a movement path.

At first, the value 1 is set to "x" which indicates the operation sequence of the working points (step S401). Next, using new position data of two working points V1(x), V1(x+1) that are operated on consecutively, it is determined whether or not an obstacle is present between the two working points V1(x), V1(x+1) (step S402). The position of the obstacle is determined using the jig position data and the workpiece design data that are stored in the new data supplying unit 34. As shown in FIG. 8A, if an obstacle is not present between the two working points V1(x), V1(x+1) within a workpiece 80 (step S402: NO), then a linear path that connects the two working points V1(x), V1(x+1) in a straight line is set as a movement path 60 (step S403). In addition, the value "x+1" is set to "x" (step S404), and it is determined if the data is complete (step S405). If the data is not complete (step S405: NO), then the process returns to step S402, and the process sequence is carried out with respect to the next working point, whereas if the data is complete (step S405: YES), the process sequence is brought to an end.

Figure 8B:
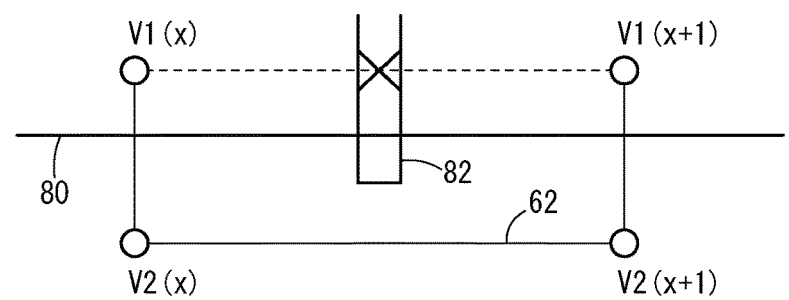
FIG. 8B is a schematic diagram for describing a first avoidance path.
Figure 8C:
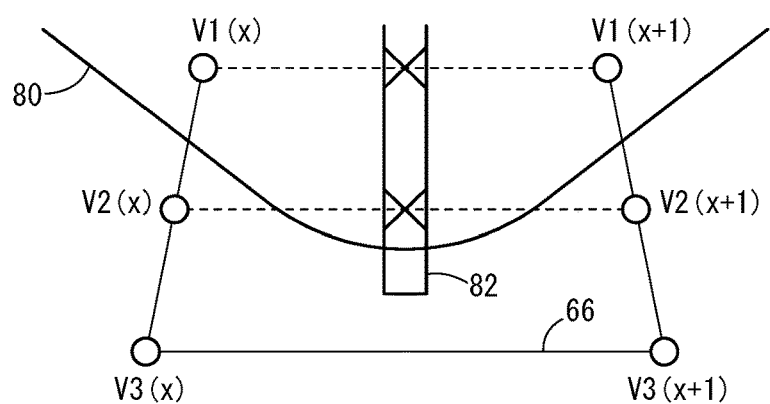
FIG. 8C is a schematic diagram for describing a third avoidance path.

In the judgment of step S402, as shown in FIGS. 8B and 8C, if it is determined that an obstacle 82 is present between the two working points V1(x), V1(x+1) within the workpiece 80 (step S402: YES), then a process is performed to create an avoidance path that avoids the obstacle 82. In order to avoid interference between the end effector 22 and the obstacle 82, it is necessary for the end effector 22 to be pulled out from the workpiece 80. Steps S501 to S505 to be described below concern such a process of pulling out the end effector 22 from the workpiece 80. The following process is performed respectively in regard to the two working points V1(x), V1(x+1).

Figure 9:
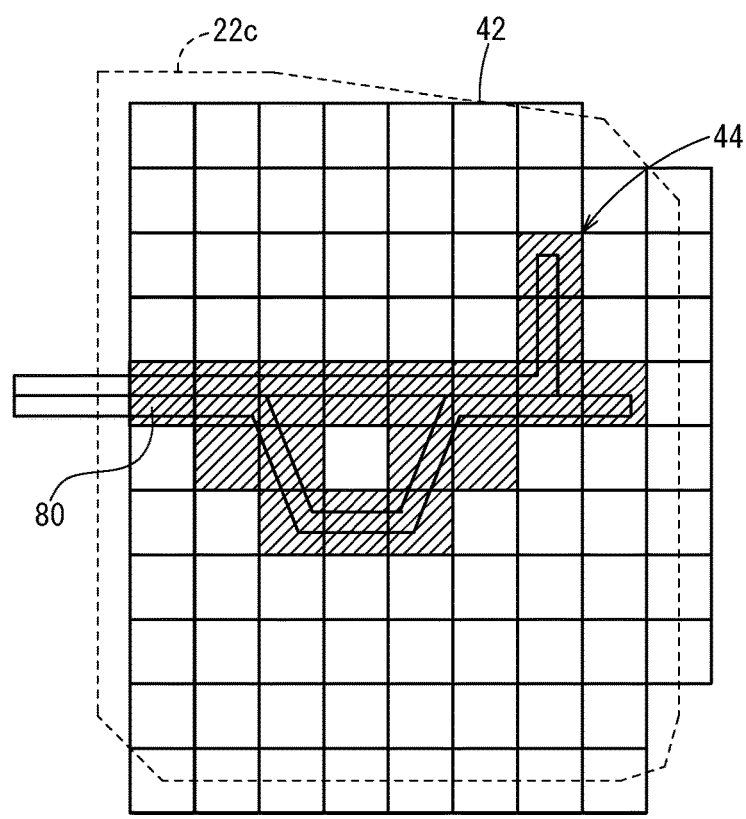
FIG. 9 is a view showing solids and a workpiece model, which are assumed virtually in an arm of an end effector.

First, as shown in FIG. 9, a lattice made up from square-shaped solids 42 is created virtually inside of an arm 22c of the end effector 22 (step S501). At this time, the solids 42 that overlap with the cross section of the workpiece 80 that lies inside of the arm 22c of the end effector 22 are used to define a workpiece model 44. Concerning the method of creating the solids 42, since this method is indicated in Patent Document 1, the description of this method is omitted herein.

Next, it is determined if the end effector 22 can be pulled outside of the workpiece 80 while maintaining the operating posture thereof (step S502). The posture of the end effector 22 is defined using the new orientation data (Rxn, Ryn, Rzn) that was prepared by the orientation data preparing unit 362. When the end effector 22 is to be pulled outside of the workpiece 80, the electrodes 22a, 22b are opened. In this regard, even if the electrodes 22a, 22b are opened, a judgment is made to determine whether the electrodes 22a, 22b or the arm 22c of the end effector 22 will interfere with the workpiece model 44.

If it is determined that the end effector 22 cannot be pulled out without interference, or more specifically, if it is determined that the workpiece model 44 interferes with the electrodes 22a, 22b or the arm 22c (step S502: NO), then since it is necessary to be pulled out by changing the posture of the end effector 22, the processes of steps S503 through S505 are performed.

It is determined whether the thickness of the workpiece model 44 (i.e., a length of the workpiece model 44 along the axial direction of the electrodes 22a, 22b) is greater than a value obtained by subtracting 40 mm from the interval between the electrodes 22a, 22b in the case that the electrodes 22a, 22b are opened (step S503). This determination is made in order to be able to ensure respective intervals of 20 mm, respectively, between the outer surfaces of the workpiece model 44 and the distal ends of each of the electrodes 22a, 22b.

If the thickness of the workpiece model 44 is less than or equal to the value obtained by subtracting 40 mm from the interval between the electrodes 22a, 22b (step S503: NO), then as the posture of the end effector 22, a posture is created in which the interval between the outer surface of the workpiece model 44 and the distal end of the electrode 22a and the interval between the outer surface of the workpiece model 44 and the distal end of the electrode 22b, respectively, are assured to be intervals of 20 mm or greater (step S504).

Figure 10A:
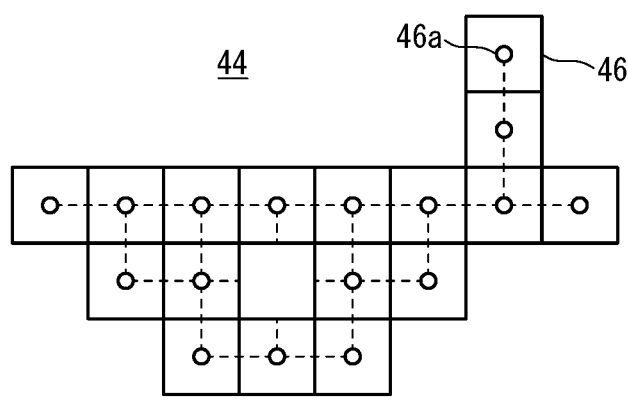
FIG. 10A is a diagram illustrating center points of workpiece solids of the workpiece model.
Figure 10B:
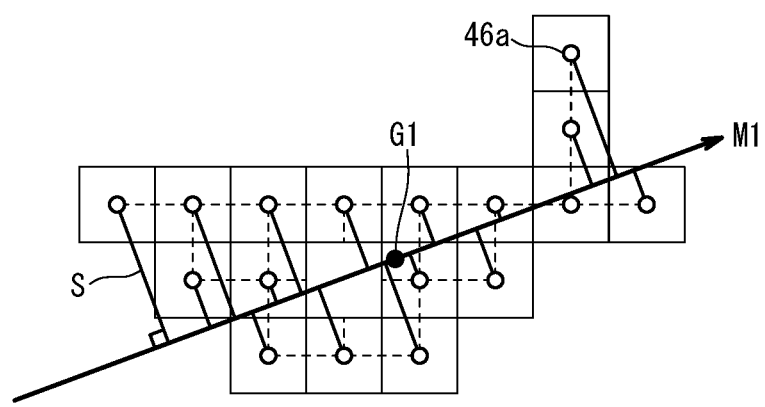
FIG. 10B is a diagram illustrating a procedure for determining a principal component line.

On the other hand, if the thickness of the workpiece model 44 is greater than the value obtained by subtracting 40 mm from the interval between the electrodes 22a, 22b (step S503: YES), then a path is created to pull out the end effector 22 while being inclined with respect to the workpiece model 44 (step S505). As a process for creating the path, center point coordinates 46a (Xs, Ys, Zs) for each of workpiece solids 46 are defined as shown in FIG. 10A. Next, as shown in FIG. 10B, the sum of squares of the distances s between each of the center point coordinates 46a and the principal component line M1 is minimized. In other words, the principal component line M1 is defined to satisfy the following relationship.

$$\Sigma |s|^2 = \min$$

More specifically, variances, eigenvalues of a covariance matrix, and eigenvectors are calculated from each of center point coordinates 44a, and further, a centroid position G1, which is an average value of the respective X, Y, Z coordinates, is determined from the center point coordinates Xs, Ys, Zs. In addition, the eigenvector that passes through the centroid position G1 becomes the principal component line M1. The principal component line M1 is treated as the pull-out path for the end effector 22. Upon being pulled out, the end effector 22 may be pulled out by being inclined, such that the axis Xr from among the three axes of the end effector 22 coincides with the principal component line M1.

Figure 11:
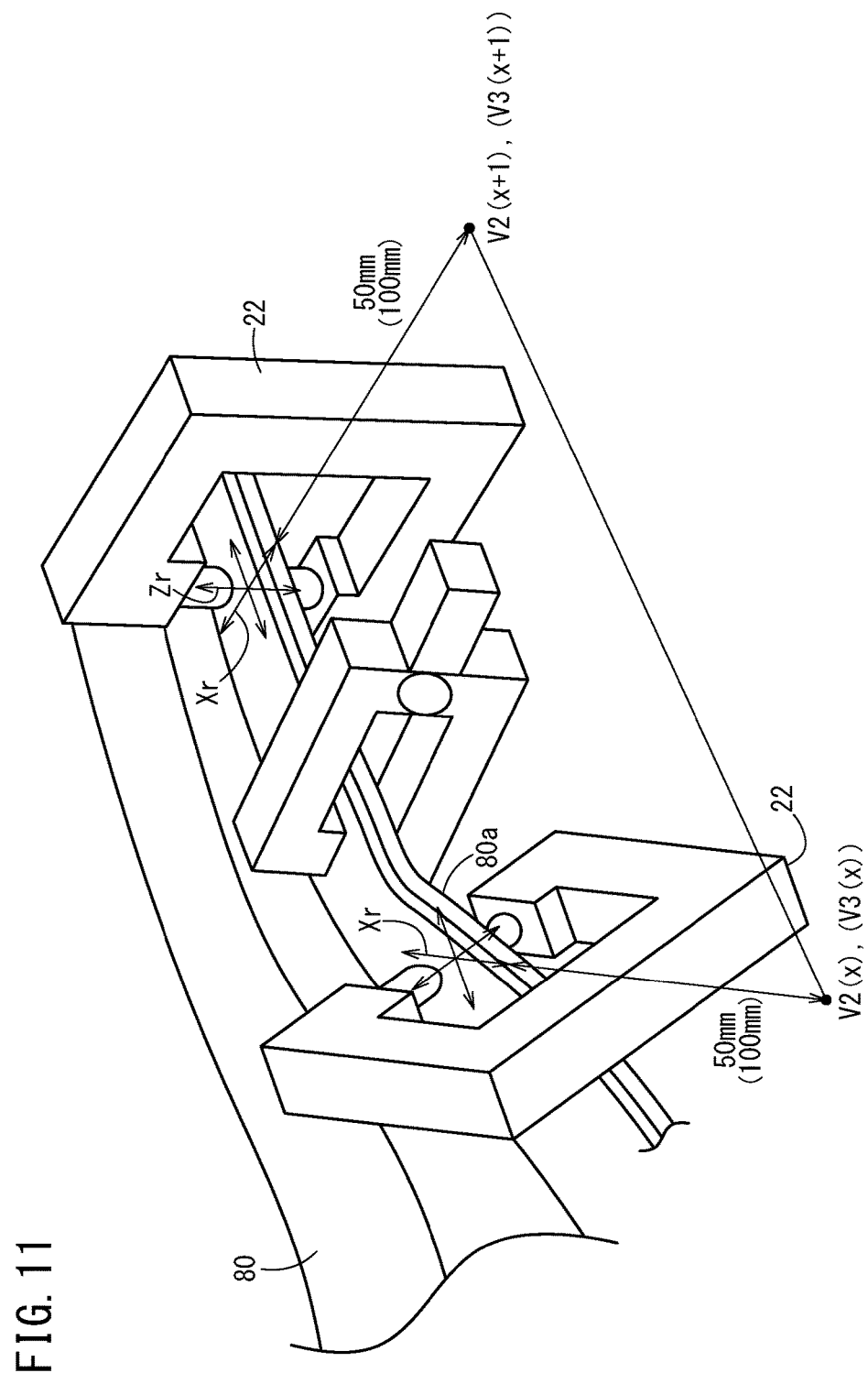
FIG. 11 is a diagram for describing first avoidance points (second avoidance points) and the first avoidance path (third avoidance path)

If it is judged that pulling out is possible without interference in step S502, or if the process of step S504 has ended, or if the process of step S505 has ended, then a first avoidance point V2(x) corresponding to the working point V1(x) is set outside of the workpiece 80 (step S506). According to the present embodiment, as shown in FIG. 11, the first avoidance point V2(x) is set to a position that lies on the axis Xr from among the three axes of the end effector 22, and is separated 50 mm in an outward direction of the workpiece 80 from an end surface 80a of the workpiece 80. At this time, position data of the first avoidance point V2(x) is calculated in advance on the basis of the new position data (Xn, Yn, Zn) of the working point V1(x). The first avoidance point V2(x+1) corresponding to the working point V1(x+1) is set in the same manner.

Next, using the position data of the two first avoidance points V2(x), V2(x+1), it is determined whether an obstacle 82 is present between the two first avoidance points V2(x), V2(x+1) (step S507). The position of the obstacle 82 is determined using the jig position data, the workpiece design data, and the obstacle position data that are stored in the new data supplying unit 34. As shown in FIG. 8B, if an obstacle 82 is not present between the two first avoidance points V2(x), V2(x+1) (step S507: NO), then a linear path that connects the two first avoidance points V2(x), V2(x+1) in a straight line, a path that connects the working point V1(x) and the first avoidance point V2(x) in a straight line, and a path that connects the working point V1(x+1) and the first avoidance point V2(x+1) in a straight line are combined and set as a first avoidance path 62, whereupon the routine proceeds to the process of step S404 of FIG. 4 (step S508).

As shown in FIG. 8C, if an obstacle 82 is present between the two first avoidance points V2(x), V2(x+1) (step S507: YES), then a process is carried out to create a path to avoid the obstacle 82 separately from the first avoidance path 62. In this regard, it is determined whether it is possible to set a second avoidance point V3(x) separately from the first avoidance point V2(x) (step S509). According to the present embodiment, as shown in FIG. 11, a position is assumed at which the position of the second avoidance point V3(x) is a position lying on the axis Xr from among the three axes of the end effector 22, and which is separated 100 mm in an outward direction of the workpiece 80 from the end surface 80a of the workpiece 80. Thus, it is determined whether there is an obstacle 82 present in an interval from the working point V1(x) up to the assumed point of the second avoidance point V3(x).

Figure 12:
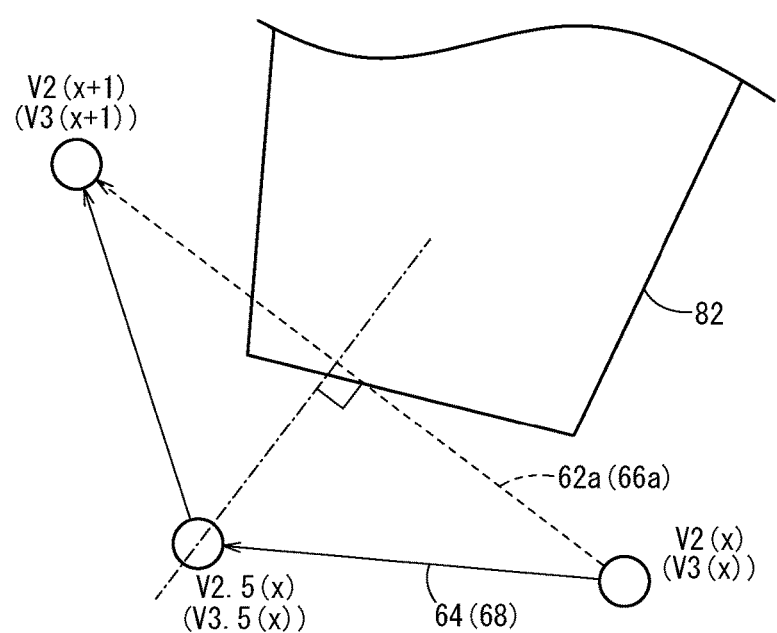
FIG. 12 is a diagram for describing an avoidance point.

If an obstacle 82 is present (step S509: NO), then the second avoidance point V3(x) cannot be set. Thus, it is determined whether it is possible to set between the first avoidance points V2(x), V2(x+1) an avoidance path other than the first avoidance path 62 (step S510). For example, as shown in FIG. 12, it is determined whether it is possible to set an avoidance point V2.5(x) in a direction away from the obstacle 82, and in a direction perpendicular to a path 62a that connects the two first avoidance points V2(x), V2(x+1).

If it is determined that the avoidance point V2.5(x) cannot be set (step S510: NO), then it is judged that it is impossible to automatically set a movement path for the end effector 22 between the two working points V1(x), V1(x+1) (step S511), whereupon the routine proceeds to the process of step S404 of FIG. 4. At this time, a message indicative of the fact that automatic setting of the movement path is impossible is displayed on the screen of the terminal device 38. Moreover, the movement path between the two working points V1(x), V1(x+1), for which the movement path could not be set automatically, is set manually by the operator.

On the other hand, if it is determined that the avoidance point V2.5(x) can be set (step S510: YES), then a linear path that connects the first avoidance point V2(x) and the avoidance point V2.5(x) in a straight line, a linear path that connects the avoidance point v2.5(x) and the first avoidance point V2(x+1) in a straight line, a path that connects the working point V1(x) and the first avoidance point V2(x) in a straight line, and a path that connects the working point V1(x+1) and the first avoidance point V2(x+1) in a straight line are combined and set as a second avoidance path 64, whereupon the routine proceeds to the process of step S404 of FIG. 4 (step S512).

If, according to the judgment of step S509, it is determined that an obstacle 82 is absent (step S509: YES), then the routine proceeds to step S513 of FIG. 7, and the second avoidance point V3(x) is set. In this regard, according to the same method used for setting the first avoidance point V2(x), the second avoidance point V3(x) corresponding to the working point V1(x) is set outside of the workpiece 80. More specifically, as shown in FIG. 11, the second avoidance point V3(x) is set to a position that lies on the axis Xr from among the three axes of the end effector 22, and is separated 100 mm in an outward direction of the workpiece 80 from the end surface 80a of the workpiece 80. At this time, position data of the second avoidance point V3(x) is calculated in advance on the basis of the new position data (Xn, Yn, Zn) of the working point V1(x). The second avoidance point V3(x+1) corresponding to the working point V1(x+1) is set in the same manner.

Next, using the position data of the two second avoidance points V3($x$), V3($x$+1), it is determined whether an obstacle 82 is present between the two second avoidance points V3($x$), V3($x$+1) (step S514). The position of the obstacle 82 is determined using the jig position data, the workpiece design data, and the obstacle position data that are stored in the new data supplying unit 34. As shown in FIG. 8C, if an obstacle 82 is not present between the two second avoidance points V3($x$), V3($x$+1) (step S514: NO), then the routine proceeds to step S515, and a linear path that connects the two second avoidance points V3($x$), V3($x$+1) in a straight line, a path that connects the working point V1($x$) and the second avoidance point V3($x$) in a straight line, and a path that connects the working point V1($x$+1) and the second avoidance point V3($x$+1) in a straight line are combined and set as a third avoidance path 66, whereupon the routine proceeds to the process of step S404 of FIG. 4.

If an obstacle 82 is present between the two second avoidance points V3($x$), V3($x$+1) (step S514: YES), then it is determined whether it is possible to set an avoidance path apart from the third avoidance path 66 between the second avoidance points V3($x$), V3($x$+1) (step S516). For example, as shown in FIG. 12, it is determined whether it is possible to set an avoidance point V3.5($x$) in a direction away from the obstacle 82, and in a direction perpendicular to a path 66$a$ that connects the two second avoidance points V3($x$), V3($x$+1).

If it is determined that the avoidance point V3.5($x$) cannot be set (step S516: NO), then it is judged that it is impossible to automatically set a movement path for the end effector 22 between the two working points V1($x$), V1($x$+1) (step S517), whereupon the routine proceeds to the process of step S404 of FIG. 4. At this time, a message indicative of the fact that automatic setting of the movement path is impossible is displayed on the screen of the terminal device 38. Moreover, the movement path between the two working points V1($x$), V1($x$+1), for which the movement path could not be set automatically, is set manually by the operator.

On the other hand, if it is determined that the avoidance point V3.5($x$) can be set (step S516: YES), the routine proceeds to step S518, and a linear path that connects the second avoidance point V3($x$) and the avoidance point V3.5($x$) in a straight line, a linear path that connects the avoidance point V3.5($x$) and the second avoidance point V3($x$+1) in a straight line, a path that connects the working point V1($x$) and the second avoidance point V3($x$) in a straight line, and a path that connects the working point V1($x$+1) and the second avoidance point V3($x$+1) in a straight line are combined and set as a fourth avoidance path 68, whereupon the routine proceeds to the process of step S404 of FIG. 4.

In the above process, the orientation of the end effector 22 at respective working points V1($x$), and movement paths between the two working points V1($x$), V1($x$+1) are set as teaching data.

In the present embodiment, when the teaching data for the new workpiece are set, data are searched for and used that approximate to a certain extent or more the data of the new workpiece from among all of the data that relates to the preexisting workpiece. Therefore, it is possible to enhance the accuracy of the teaching data.

Further, in the present embodiment, the preexisting orientation data that are used when preparing the new orientation data are searched for mechanically by a specified approximating determination. Therefore, extraction of the preexisting orientation data can easily be performed regardless of the experience of the operator. As a result, the setting operation for the teaching data can be facilitated.

The invention claimed is:

1. A teaching data preparation device for an articulated robot, for carrying out an operation in accordance with teaching data to sequentially move an end effector, which is attached to a distal end of an arm, to a plurality of working points that are set on a workpiece, comprising:
   a preexisting data storage unit configured to store in association with each of the working points, and from among data relating to working points of a preexisting workpiece, preexisting position data that indicates positions of the working points, and preexisting orientation data that indicates orientations of the end effector at the working points;
   a new data supplying unit configured to supply, from among data relating to working points of a new workpiece, new position data that indicates positions of the working points, and incomplete new orientation data that indicates orientations of the end effector at the working points; and
   an orientation data preparing unit configured to search for and retrieve the preexisting position data that approximates the new position data based on a judgement that a difference between the preexisting position data stored in the preexisting position data storage unit and the new position data of the new data supplying unit lies within a predetermined range, extract the preexisting orientation data that is associated with the retrieved preexisting position data, and complete the incomplete new orientation data using the extracted preexisting orientation data.

2. The teaching data preparation device for the articulated robot according to claim 1, wherein:
   the preexisting orientation data and the new orientation data are indicated by angles of rotation centered about three mutually perpendicular axes of rotation taking the working points as reference points; and
   the incomplete new orientation data is indicated by an angle of rotation centered about an axis of rotation that coincides with a normal direction of a surface of the working points from among the three axes of rotation.

3. The teaching data preparation device for the articulated robot according to claim 1, wherein the orientation data preparing unit is configured to associate the new position data and the new orientation data with each other and store them in the preexisting data storage unit.

4. The teaching data preparation device for the articulated robot according to claim 1, further comprising a movement path setting unit configured to, using the new position data and the new orientation data for each of the working points, set a movement path of the end effector between two of the working points of the new workpiece.

5. The teaching data preparation device for the articulated robot according to claim 4, wherein:
   the new data supplying unit is configured to supply obstacle position data for indicating a position of an obstacle that lies within a range in which the end effector is capable of moving; and
   the movement path setting unit is configured to determine whether or not the obstacle is present between the two working points, and set as the movement path a linear path that connects the two working points in a straight line in a case it is determined that the obstacle is not present between the two working points, and set an avoidance path that avoids the obstacle in a case it is determined that the obstacle is present between the two working points.

6. A teaching data preparation method for an articulated robot, for carrying out an operation in accordance with teaching data to sequentially move an end effector, which is attached to a distal end of an arm, to a plurality of working points that are set on a workpiece, comprising:
- a new data supplying step of supplying, from among data relating to working points of a new workpiece, new position data that indicates positions of the working points, and incomplete new orientation data that indicates orientations of the end effector at the working points;
- a preexisting data searching step of searching for and retrieving preexisting position data that approximates the new position data supplied by the new data supplying step from a database in which, from among data relating to the working points of a preexisting workpiece, there are stored in association with each of the working points, preexisting position data that indicates positions of the working points, and preexisting orientation data that indicates orientations of the end effector at the working points;
- a preexisting data extraction step of extracting the preexisting orientation data that is associated with the retrieved preexisting position data; and
- an orientation data preparation step of completing the incomplete new orientation data using the extracted preexisting orientation data based on a judgement that a difference between the preexisting position data stored in the preexisting position data storage unit and the new position data of the new data supplying unit lies within a predetermined range.

7. The teaching data preparation method for the articulated robot according to claim 6, wherein, in the orientation data preparation step, the new position data and the new orientation data are associated with each other and stored in the database.

8. The teaching data preparation method for the articulated robot according to claim 6, further comprising a movement path setting step of setting a movement path of the end effector between two of the working points of the new workpiece, using the new position data and the new orientation data for each of the working points.

9. The teaching data preparation method for the articulated robot according to claim 8, wherein the movement path setting step includes:
- a determining step that determines whether or not an obstacle is present between two of the working points;
- a linear path setting step that sets as the movement path a linear path that connects the two working points in a straight line, in a case it is determined that the obstacle is not present between the two working points; and
- an avoidance path setting step that sets an avoidance path for avoiding the obstacle, in a case it is determined that the obstacle is present between the two working points.

* * * * *